(12) United States Patent
Lin

(10) Patent No.: US 7,428,020 B2
(45) Date of Patent: Sep. 23, 2008

(54) METHOD AND APPARATUS FOR NOISE REDUCTION OF VIDEO SIGNALS

(75) Inventor: Hsin-I Lin, Yilan (TW)

(73) Assignee: Novatek Microelectronics Corp., Hsinchu (TW)

( * ) Notice: Subject to any disclaimer, the term of this patent is extended or adjusted under 35 U.S.C. 154(b) by 577 days.

(21) Appl. No.: 11/220,793

(22) Filed: Sep. 6, 2005

(65) Prior Publication Data
US 2006/0215796 A1   Sep. 28, 2006

(30) Foreign Application Priority Data
Mar. 8, 2005   (TW) .............................. 94106898 A

(51) Int. Cl.
*H04N 5/21*   (2006.01)
(52) U.S. Cl. ..................... 348/607; 348/618; 382/260
(58) Field of Classification Search ................ 348/607, 348/618, 619, 620, 622, 621, 627, 610; 382/260–265
See application file for complete search history.

(56) References Cited
U.S. PATENT DOCUMENTS

| | | | | |
|---|---|---|---|---|
| 5,742,355 A | * | 4/1998 | De Haan et al. ............. | 348/607 |
| 5,903,680 A | * | 5/1999 | De Haan et al. ............. | 382/265 |
| 6,061,100 A | * | 5/2000 | Ward et al. .................. | 348/607 |
| 6,181,382 B1 | * | 1/2001 | Kieu et al. .................. | 348/459 |
| 7,145,607 B1 | * | 12/2006 | Hui ............................. | 348/607 |

\* cited by examiner

*Primary Examiner*—M. Lee
(74) *Attorney, Agent, or Firm*—J.C. Patents

(57) ABSTRACT

The present invention provides a method of noise reduction applied in digital video signal processing according to the following steps. A video signal is received initially; after the adaptive spatial filtering, a basic signal is generated. The basic signal is then divided into a number of N bandwidth divisions of spatial domain signals. Each spatial domain signal is undergone a corresponding adaptive temporal filtering and a plurality of corresponding temporal filtered signals is generated. Each temporal filtered signal is undergone individual noise estimation, and a corresponding feedback signal is generated in order to control the corresponding adaptive temporal filtering. In the end, all temporal filtered signals are summed up to a processed video signal; where N is a natural number.

14 Claims, 4 Drawing Sheets

METHOD AND APPARATUS FOR NOISE REDUCTION OF VIDEO SIGNALS

CROSS-REFERENCE TO RELATED APPLICATION

This application claims the priority benefit of Taiwan application serial no. 94106898, filed on Mar. 8, 2005. All disclosure of the Taiwan application is incorporated herein by reference.

BACKGROUND OF THE INVENTION

1. Field of the Invention

The present invention relates to a method for effectively reducing noise, and more particularly, to a method for effectively reducing noise while processing video signals.

2. Description of the Related Art

The video signal media is currently considered the most powerful media for transmitting message, and the digital signal processing is widely applied in the video signal applications. An HDTV (High Definition Television) is a technique heavily relied on utilizing the digital processing. Since various noises are contained in the analog step of video signal digitalization, in order to eliminate the undesired noise, an image processing technique has to be applied to filter out the undesired noise in the signal that makes human eyes uncomfortable.

The video signal usually means the motion picture image, thus the image processing technique is an essential part of the video signal processing techniques. Since the image is two-dimensional (2D), the method for processing a 2D signal is slightly different from that used for processing a typical one-dimensional (ID) signal. The most essential method for processing 2D image is using 2D FFT (Fast Fourier Transformation) and 2D convolution operations. By using 2D FFT, the 2D image is converted into a 2D spectrum. The signal having a specific frequency is then attenuated to a certain level, and the 2D spectrum is recovered to the original image by a 2D reverse FFT, such that the specific noise in the picture is eliminated.

FIG. 1 schematically shows a conventional apparatus for noise reduction, which comprises an adaptive spatial filter set 10 and an adaptive temporal filter set 30. After an unprocessed video signal p (i, j, t) is input into the adaptive spatial filter set 10 and has been undergone an adaptive spatial filtering, a basic signal z (i, j, t) is generated. Then, after the basic signal z (i, j, t) has been undergone an adaptive temporal filtering by the adaptive temporal filter set 30, a processed video signal y (i, j, t) is obtained. Since the noise reduction in such configuration is limited by using the specific parameter of a single filtering band, the result of the noise reduction is poor. Therefore, the present invention is aimed on a more effective way to resolve this issue.

SUMMARY OF THE INVENTION

Therefore, it is an object of the present invention to provide a method and apparatus for noise reduction, such that the poor result of noise reduction obtained due to using the limited specific parameter of a single filtering band is reduced.

It is another object of the present invention to provide an apparatus for noise reduction using in the digital video signal processing. The apparatus for noise reduction comprises an adaptive spatial filter, a spatial filter set, N number of adaptive temporal filters, N number of noise estimators, and a summator. Wherein, N is a natural number. The adaptive spatial filter receives an unprocessed video signal, and generates a basic signal after the unprocessed video signal has been undergone an adaptive spatial filtering. The spatial filter set divides the basic signal into a number of N bandwidth divisions of spatial domain signals. Each of the N number of adaptive temporal filters performs the adaptive temporal filtering on the spatial domain signal corresponding to each adaptive temporal filter respectively, and generates corresponding temporal filtered signals. Each of the N number of noise estimators performs the noise estimation on the temporal filtered signal corresponding to each noise estimator respectively, and generates the corresponding feedback signals in order to control the corresponding adaptive temporal filtering. The summator summates all temporal filtered signals into a processed video signal.

In accordance with a preferred embodiment of the present invention, the bandwidths of the spatial domain signals may be equal, partially equal, or totally not equal with each other.

In accordance with the preferred embodiment of the present invention, wherein the step of adaptive temporal filtering is to perform an $R^{th}$ order infinite impulse response (IIR) filtering, where R is a natural number.

In accordance with another preferred embodiment of the present invention, wherein the $R^{th}$ order infinite impulse response (IIR) filtering may be a $1^{st}$ order infinite impulse response (IIR) filtering, and the $1^{st}$ order infinite impulse response (IIR) filtering is represented by the following equation:

$$y_m(i,j,t)=[1-k_m(i,j,t)]y_m(i,j,t-1)+k_m(i,j,t)x_m(i,j,t),$$

Where $x_m(i,j,t)$ is an $m^{th}$ spatial domain signal on 2D position (i, j) and timing t; $y_m(i,j,t)$ is an $m^{th}$ temporal filtered signal on 2D position (i, j) and timing t; $k_m(i,j,t)$ is a parameter of an $m^{th}$ adaptive temporal filtering executed on 2D position (i, j) and timing t; m is a natural number, and $m \leq N$.

In accordance with yet another preferred embodiment of the present invention, wherein $k_m(i,j,t)$ is a weighted summation result obtained by summating an average shift vector of a current output signal of the $m^{th}$ spatial filter and an average shift vector of a previous output signal of the corresponding $m^{th}$ adaptive temporal filter.

The present invention provides a method of noise reduction, which could be applied in digital video signal processing according to the following steps. A video signal is received initially; after the adaptive spatial filtering, a basic signal is generated. The basic signal is then divided into a number of N bandwidth divisions of spatial domain signals. Each spatial domain signal is undergone a corresponding adaptive temporal filtering and a plurality of corresponding temporal filtered signals is generated. Each temporal filtered signal is undergone individual noise estimation, and the corresponding feedback signals are generated in order to control the corresponding adaptive temporal filtering. In the end, all temporal filtered signals are summed up to a processed video signal; where N is a natural number.

BRIEF DESCRIPTION OF THE DRAWINGS

The accompanying drawings are included to provide a further understanding of the invention, and are incorporated in and constitute a part of this specification. The drawings illustrate embodiments of the invention, and together with the description, serve to explain the principles of the invention.

DESCRIPTION OF THE PREFERRED EMBODIMENTS

Figure 1:
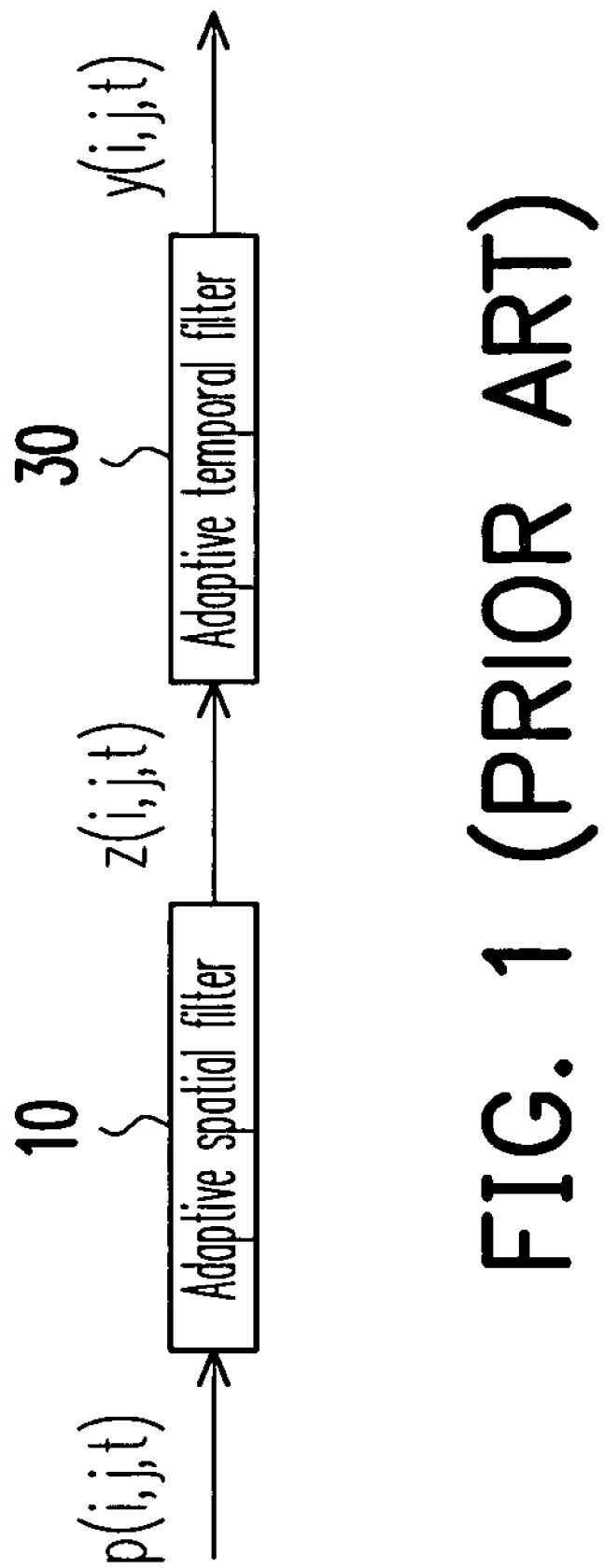
FIG. 1 is a diagram of a conventional single set of noise reduction.

The preferred characteristics of the embodiment selected in the present invention are described in great detail with referring to the drawings. The spirit and scope of the present invention are not limited by the embodiments shown here only for description. To be noted that the drawings should not be regarded to any specific size or scale. All configurations and materials described in the present invention can be appropriately modified.

A sub-band adaptive temporal filtering is utilized in the present invention to reduce the entire noise energy as the noises commonly existed in the prior art are distributed in the sub-bands. In addition, a noise estimation mechanism is used to reversely control the step of adaptive temporal filtering for each band, so as to reduce various interferences caused by the noise contained in each band.

Figure 2:
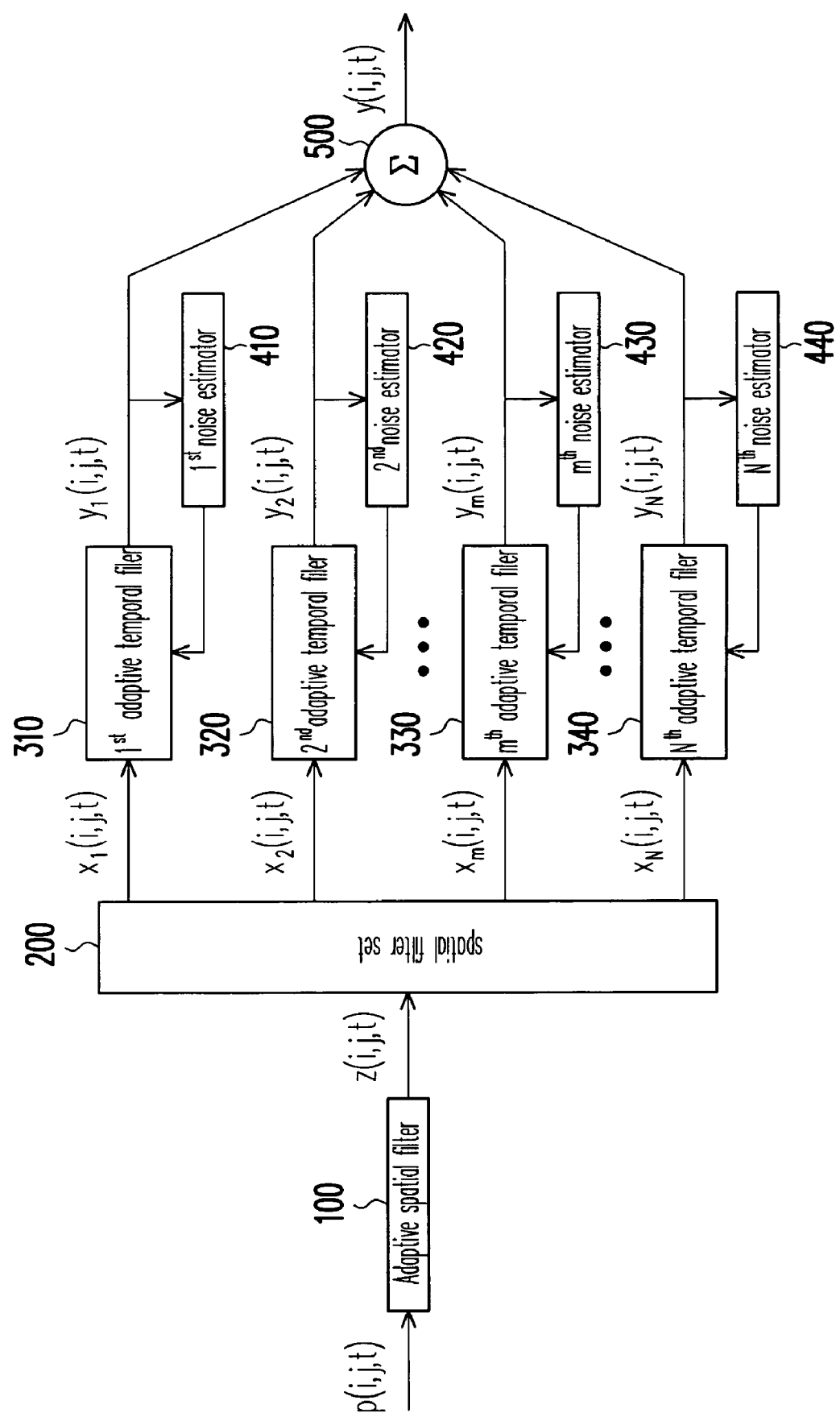
FIG. 2 is a diagram of multiple sets of noise reduction according to the present invention.

FIG. 2 schematically shows an apparatus for noise reduction and a method thereof, which illustrates a process of effectively reducing noise of the video signal according to a preferred embodiment of the present invention.

The diagram shown in FIG. 2 comprises an adaptive spatial filter 100, a spatial filter set 200, a first adaptive temporal filter 310, a second adaptive temporal filter 320, an $m^{th}$ adaptive temporal filer 330, an $N^{th}$ adaptive temporal filter 340, a first noise estimator 410, a second noise estimator 420, an $m^{th}$ noise estimator 430, an $N^{th}$ noise estimator 440, and a summator 500.

First, an unprocessed video signal p (i, j, t) is input into the adaptive spatial filter 100, and after the unprocessed video signal p (i, j, t) has been undergone an adaptive spatial filtering, a basic signal z (i, j, t) is generated. Then, the basic signal z (i, j, t) is divided into a number of N bandwidth divisions of spatial domain signals by the spatial filter set 200. Each of the spatial domain signals $x_1(i,j,t), x_2(i,j,t), \ldots, x_m(i,j,t), \ldots,$ and $x_N(i,j,t)$ is undergone an adaptive temporal filtering based on the motion detection by the corresponding adaptive temporal filter that are the first adaptive temporal filter 310, the second adaptive temporal filter 320, ..., the $m^{th}$ adaptive temporal filter 330, ..., and the $N^{th}$ adaptive temporal filter 340; and the corresponding temporal filtered signals $y_1(i,j,t), y_2(i,j,t), \ldots, y_m(i,j,t), \ldots,$ and $y_N(i,j,t)$ are generated, respectively.

Since each band set has its specific frequency range, and each bandwidth may be equal, or even totally not equal to with each other, the noise estimation suitable for it is slightly different. In order to cope with these differences, each of the corresponding temporal filtered signals $y_1(i,j,t), y_2(i,j,t), \ldots, y_m(i,j,t), \ldots,$ and $y_N(i,j,t)$ has its own noise estimator, that is the first noise estimator 410, the second noise estimator 420, ..., the $m^{th}$ noise estimator 430, ..., and the $N^{th}$ noise estimator 440 shown in FIG. 2. Then, each of the noise estimators reversely controls the first adaptive temporal filter 310, the second adaptive temporal filter 320, ..., the $m^{th}$ adaptive temporal filter 330, ..., the $N^{th}$ adaptive temporal filter 340 respectively, so as to adjust each individual parameter.

Then, all temporal filtered signals $y_1(i,j,t), y_2(i,j,t), \ldots, y_m(i,j,t), \ldots,$ and $y_N(i,j,t)$ are summated by the summator 500 so as to obtain a processed video signal y (i, j, t).

In a preferred embodiment of the present invention, the step of adaptive temporal filtering executed by the adaptive temporal filter of the present invention uses an $R^{th}$ order infinite impulse response (IIR), and the $R^{th}$ order IIR may be a $1^{st}$ order IIR represented by the following equation:

$$y_m(i,j,t) = [1-k_m(i,j,t)]y_m(i,j,t-1) + k_m(i,j,t)x_m(i,j,t),$$

where $x_m(i,j,t)$ is an $m^{th}$ spatial domain signal on 2D position (i,j) and timing t; $y_m(i,j,t)$ is an $m^{th}$ temporal filtered signal on 2D position (i,j) and timing t; $k_m(i,j,t)$ is a parameter of an $m^{th}$ adaptive temporal filtering executed on 2D position (i, j) and timing t; m is a natural number and $m \leq N$; and i, j, and t are any real numbers.

Figure 3:
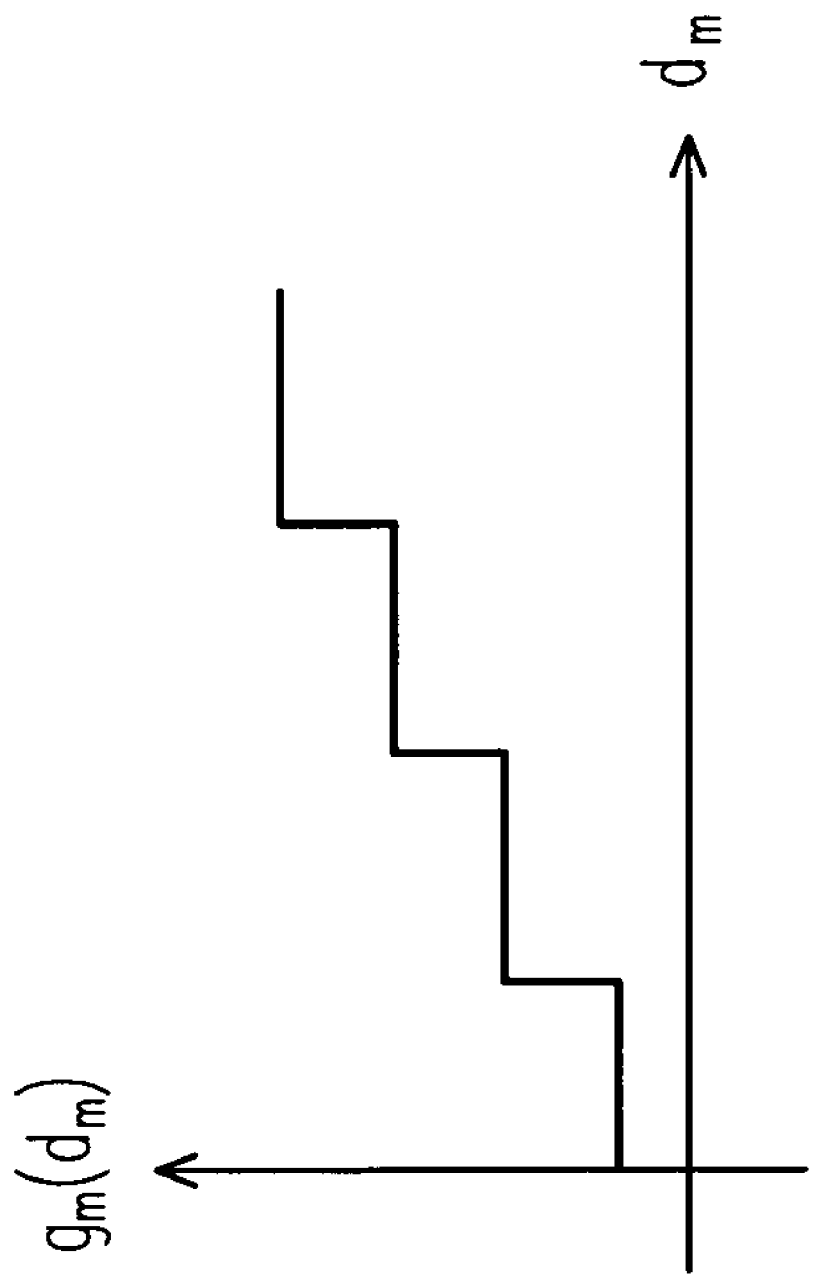
FIG. 3 is a relationship diagram of the function $g_m(d_m)$ and $d_m$.

The parameter $k_m(i,j,t)$ of the $m^{th}$ adaptive temporal filtering is generated by the following equation:

$$k_m(i, j, t) = \begin{cases} k'_m(i, j, t) + k''_m(i, j, t), & k'_m(i, j, t) + k''_m(i, j, t) < 1 \\ 1, & k'_m(i, j, t) + k''_m(i, j, t) \geq 1 \end{cases}$$

$$k'_m(i, j, t) = \alpha_m \times d_{m,1},$$

$$d_{m,1} = \sum_{u,v \in S} |x_m(i+u, j+v, t) - x_m(i+u, j+v, t-1)|,$$

$$k''_m(i, j, t) = \beta_m \times d_{m,2}, \beta_m = g_m(d_{m,2}),$$

$$d_{m,2} = \sum_{u,v \in S} |x_m(i+u, j+v, t) - y_m(i, j, t-1)|,$$

where S is a working window with a center of $x_m(i,j,t)$; u, v are the X-axis and Y-axis pixel coordinates in the working window S respectively; $\alpha_m$ and $g_m()$ are set up by the individual noise estimator for each band; and function $g_m(d_m)$ is proportional to $d_m$ as shown in FIG. 3.

Figure 4:
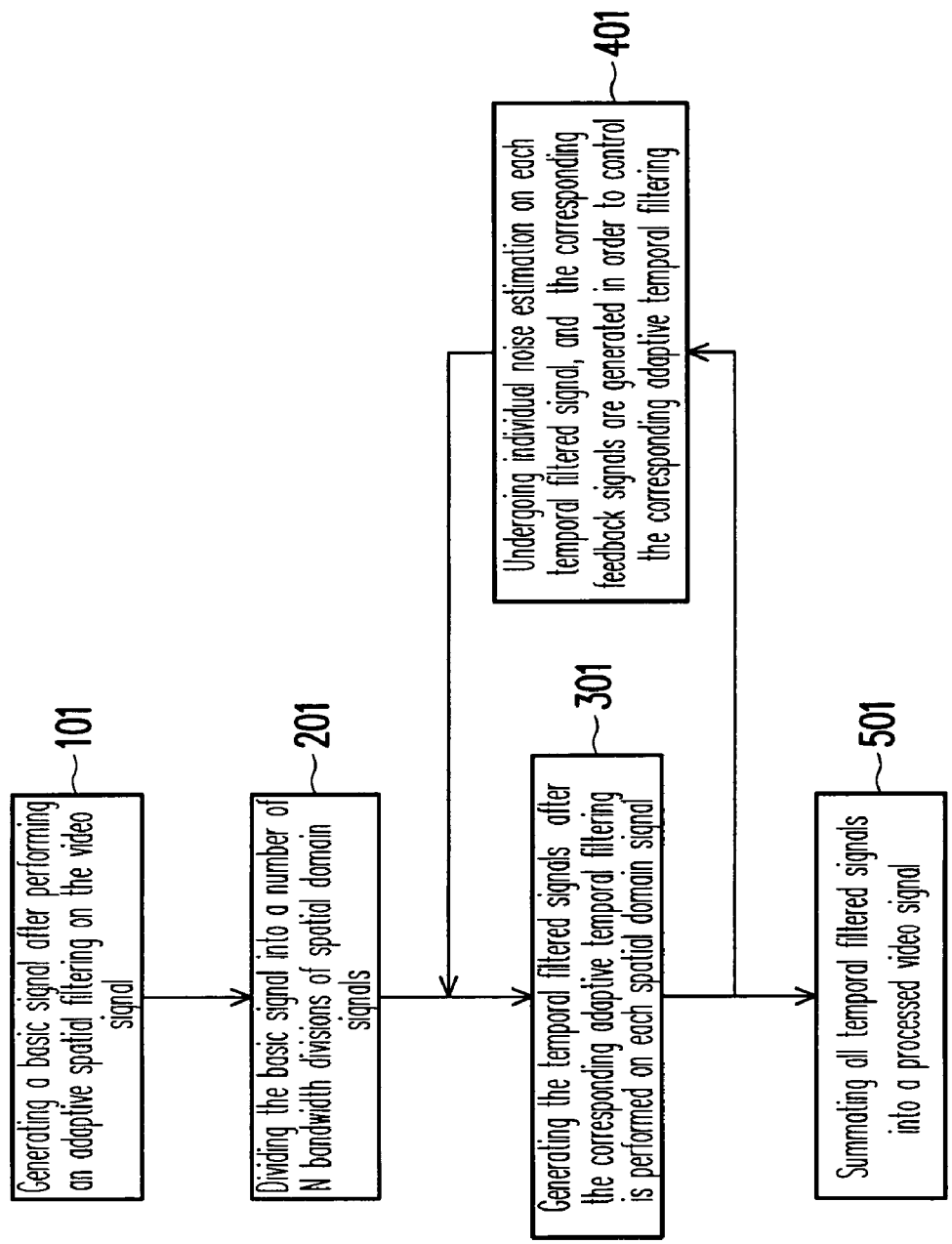
FIG. 4 is a flow chart illustrating the effective steps of a method for noise reduction according to the present invention.

As shown in FIG. 4, the preferred embodiment of the present invention provides the effective steps of reducing noise. First in step 101, a video signal is received; and after the adaptive spatial filtering, a basic signal is generated. Then in step 201, the basic signal is divided into a number of N bandwidth divisions of spatial domain signals. Then in step 301, each spatial domain signal is undergone a corresponding adaptive temporal filtering by the corresponding adaptive temporal filtering step respectively, and a plurality of corresponding temporal filtered signals is generated. Then in step 401, each temporal filtered signal is undergone individual noise estimation, and the corresponding feedback signals are generated in order to control the corresponding adaptive temporal filtering. Finally in step 501, all temporal filtered signals are summed to a processed video signal.

The present invention uses the sub-band adaptive temporal filtering to perform an adaptive temporal filtering on the original single full-band with a multi-set of sub-bands, such that each individual adaptive temporal filtering parameter can be adjusted based on the characteristic of the video signal for each band, respectively. For example, the higher the detected operation changes, the lower the number of the peripheral pixel averaging method to be executed. Contrarily, the lower the detected operation changes, the higher the number of the peripheral pixel averaging method to be executed.

Since the present invention removes the noises and maintains the original picture quality with a multi-set technique, the issue of the noise interference in the adaptive temporal filtering in the prior art is resolved. Accordingly, the present invention effectively resolves the currently existing noise processing issue in the video signal processing.

Although the invention has been described with reference to a particular embodiment thereof, it will be apparent to one of the ordinary skill in the art that modifications to the described embodiment may be made without departing from the spirit of the invention. Accordingly, the scope of the invention will be defined by the attached claims not by the above detailed description.

What is claimed is:

1. An apparatus for noise reduction adoptable in a digital video signal processing, the apparatus comprising:
   an adaptive spatial filter for receiving a video signal and generating a basic signal after the video signal is undergone an adaptive spatial filtering;
   a spatial filter set for dividing the basic signal into a number of N bandwidth divisions of spatial domain signals, where N is a natural number;
   N number of adaptive temporal filters for performing an adaptive temporal filtering on each of the spatial domain signals corresponding to each of the adaptive temporal filters respectively, so as to generate a temporal filtered signal;
   N number of noise estimators for performing a noise estimation on the temporal filtered signal corresponding to each of the noise estimators, and generating a corresponding feedback signal in order to control the corresponding adaptive temporal filtering; and
   a summator for summing up all of the temporal filtered signals to a processed video signal.

2. The apparatus for noise reduction of claim 1, wherein the bandwidths of the spatial domain signals are all equal.

3. The apparatus for noise reduction of claim 1, wherein the bandwidths of the spatial domain signals are partially equal one another.

4. The apparatus for noise reduction of claim 1, wherein the bandwidths of the spatial domain signals are totally not equal.

5. The apparatus for noise reduction of claim 1, wherein the adaptive temporal filter is an $R^{th}$ order infinite impulse response (IIR) filter, and R is a natural number.

6. The apparatus for noise reduction of claim 5, wherein the $R^{th}$ order infinite impulse response (IIR) filter is a $1^{st}$ order infinite impulse response (IIR) filter, and the filtering operation of the $1^{st}$ order infinite impulse response (IIR) filter is represented by following equation:

$$y_m(i,j,t)=[1-k_m(i,j,t)]y_m(i,j,t-1)+k_m(i,j,t)x_m(i,j,t),$$

where $x_m(i,j,t)$ is an $m^{th}$ spatial domain signal on 2D position (i,j) and timing t; $y_m(i,j,t)$ is an $m^{th}$ temporal filtered signal on 2D position (i,j) and timing t; $k_m(i,j,t)$ is a parameter of an $m^{th}$ adaptive temporal filtering executed on 2D position (i,j) and timing t; m is a natural number and m≦N; and i, j, and t are any real numbers.

7. The apparatus for noise reduction of claim 6, wherein $k_m(i,j,t)$ is a weighted summation result obtained by summating an average shift vector of a current output signal of the $m^{th}$ spatial filter and an average shift vector of a previous output signal of the corresponding $m^{th}$ adaptive temporal filter.

8. A method for noise reduction using in a digital video signal processing, the method comprising:
   receiving a video signal and generating a basic signal after the video signal is undergone an adaptive spatial filtering;
   dividing the basic signal into a number of N bandwidth divisions of spatial domain signals, where N is a natural number;
   performing an adaptive temporal filtering on each of the spatial domain signals respectively, so as to generate a corresponding temporal filtered signal;
   performing an individual noise estimation on each of the temporal filtered signals and generating a corresponding feedback signal in order to control the corresponding adaptive temporal filtering; and summating all of the temporal filtered signals into a processed video signal.

9. The method for noise reduction of claim 8, wherein the bandwidths of the spatial domain signals are all equal.

10. The method for noise reduction of claim 8, wherein the bandwidths of the spatial domain signals are partially equal one another.

11. The method for noise reduction of claim 8, wherein the bandwidths of the spatial domain signals are totally not equal.

12. The method for noise reduction of claim 8, wherein the step of adaptive temporal filtering is performing a $R^{th}$ order infinite impulse response (IIR) filtering, and R is a natural number.

13. The method for noise reduction of claim 12, wherein the $R^{th}$ order infinite impulse response (IIR) filter is a $1^{st}$ order infinite impulse response (IIR) filter, and the filtering operation of the $1^{st}$ order infinite impulse response (IIR) filter is represented by following equation:

$$y_m(i,j,t)=[1-k_m(i,j,t)]y_m(i,j,t-1)+k_m(i,j,t)x_m(i,j,t),$$

where $x_m(i,j,t)$ is an $m^{th}$ spatial domain signal on 2D position (i,j) and timing t, $y_m(i,j,t)$ is an $m^{th}$ temporal filtered signal on 2D position (i,j) and timing t, $k_m(i,j,t)$ is a parameter of an $m^{th}$ adaptive temporal filtering executed on 2D position (i,j) and timing t, m is a natural number and m≦N, and i,j, and t are any real numbers.

14. The method for noise reduction of claim 13, wherein $k_m(i,j,t)$ is a weighted summation result obtained by summating an average shift vector of a current output signal of the $m^{th}$ spatial filter and an average shift vector of a previous output signal of the corresponding $m^{th}$ adaptive temporal filter.

* * * * *